Patented May 28, 1940

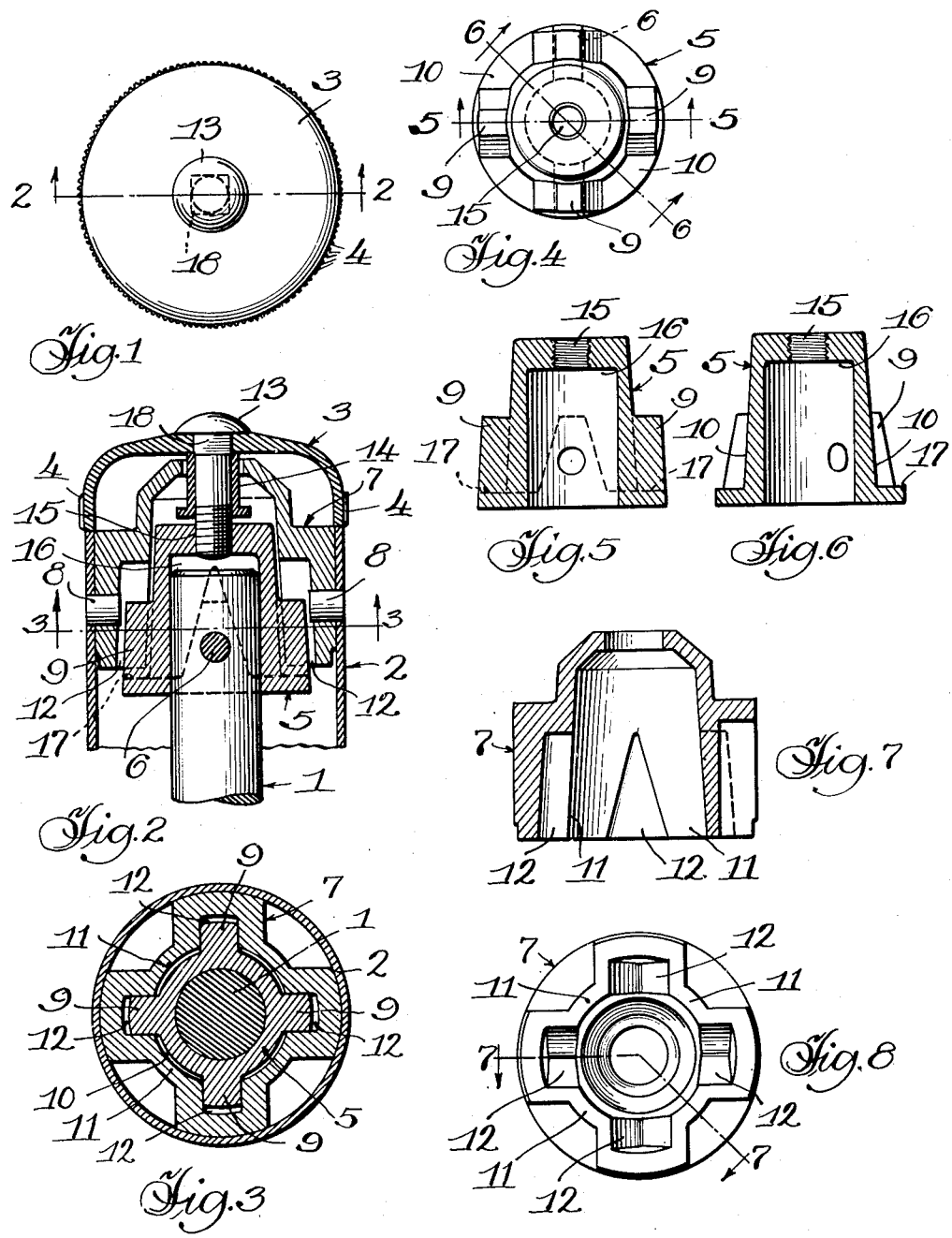

2,202,679

UNITED STATES PATENT OFFICE 2,202,679

TAPERED LUG TORQUE

Charles K. Woodin, Newton, Iowa, assignor to The Maytag Company, Newton, Iowa, a corporation of Delaware Application September 17, 1937, Serial No. 164,378

2 Claims. (Cl. 287—53)

The present invention relates to a torque drive and more particularly to a novel drive and mounting for an agitator for a washing machine.

Among the objects of the present invention is to provide a novel torque assembly for driving a washing machine agitator and including a drive torque or head and a torque socket, each provided with a plurality of spaced lugs and slots or channels so related and arranged as to intermesh and form a driving connection between the removable agitator and drive shaft.

A further object of the invention is the provision of torque construction having a driving member mounted on the end of a shaft such as the drive shaft of a washing machine, and a complementary driven member mounted on the object to be driven, such as an agitator which is removably mounted upon the drive shaft, these complementary members having tapered lugs and slots or grooves therebetween so constructed and designed as to engage and interlock and thereby form a firm driving connection for rotating or oscillating the agitator from the drive shaft.

Further objects, advantages, capabilities and changes are comprehended and will be apparent from the detailed description and disclosure in the drawing, as are inherent in the device.

In the drawing:

Figure 1 is a top plan view of the center post of an agitator for a washing machine equipped with the novel invention.

Fig. 2 is a fragmentary view in vertical cross-section taken on the line 2—2 of Fig. 1.

Fig. 3 is a view in horizontal cross-section taken on the line 3—3 of Fig. 2.

Fig. 4 is a top plan view of the drive torque or head.

Fig. 5 is a view in vertical cross-section of the drive torque or head taken on the line 5—5 of Fig. 4.

Fig. 6 is a view similar to Fig. 5 but taken on the line 6—6 of Fig. 4

Fig. 7 is a view in vertical cross-section of the torque socket taken on the irregular line 7—7 of Fig. 8.

Fig. 8 is a bottom elevational view of the torque socket.

Referring more particularly to the disclosure in the drawing, the novel construction of the tapered lug torque is shown embodied in a washing machine in which the numeral 1 refers to the agitator drive shaft, upon which is removably mounted an agitator having a center post 2 and a cap 3 provided with peripheral knurls 4.

The novel embodiment of the lug torque comprises a drive torque or head 5 suitably keyed or fixed to the drive shaft as at 6, and a torque socket or female member 7 suitably keyed or fixed to the center post 2 by means of pins or the like 8 and adapted to encompass the drive head and interlock therewith. This interlocking is accomplished by means of relatively short tapered lugs 9 and intermediate grooves or channels 10 on the drive head 5 and complementary ribs 11 and channels 12 on the inner periphery of the torque socket. This construction permits a ready removal and/or replacement of the agitator to permit the operator to remove and clean the agitator and the tub positioned therebelow.

In order to adjust the driving parts to compensate for any wear or play, the cap 3 is provided with a truss head bolt 13 adjustable in a sleeve nut 14 with the lower threaded end of the bolt received in a threaded recess 15 in the upper face or end of the drive torque or head 5. A removal or unscrewing of the truss head bolt 13 from the drive head 5 permits a ready removal or replacement of the agitator, and when this bolt is screwed downwardly the complementary drive lugs and ribs and their grooves are moved into tight contact, thereby eliminating any knock or looseness in the fit of these parts. To permit such adjustment, a space 16 is provided intermediate the top of the drive head and the upper end of the drive shaft 1, which permits the torque socket and the agitator center post to be adjusted downwardly or until the lower face of the ribs 11 abut the shoulder 17 formed at the lower portion of the torque drive or head 5.

It will be clearly evident from the above description and the disclosure in the drawing that the novel invention comprehends a torque drive construction which is simple in operation and adjustment, and which permits a ready removal of the agitator for cleaning or replacement as well as a cleaning of the space below the agitator. This removal is accomplished by a mere unscrewing of the knurled cap 3 which carries with it the bolt 13 and sleeve nut 14 through the squared shank 18 of the bolt. By reason of the short tapered lug construction, the drive head or torque drive and socket is provided with fewer and more rigid engaging parts than were splines employed. Furthermore, in view of the employment of these fewer and wider engaging parts there is greater surface contact between the driving and driven lug elements and less wear on these parts.

Having thus disclosed the invention, I claim:

1. In a drive torque construction for oscillating the agitator center post of a washing machine from the drive shaft, a drive torque mounted on the end of the shaft and provided with an outwardly projecting shoulder at its lower end and a plurality of spaced tapered lugs and channels therebetween extending upwardly from the shoulder to a point intermediate the upper and lower ends of the drive torque, and a torque socket secured to the center post and provided with complementary tapered ribs and channels adapted to engage the lugs and channels, with the socket having a driving contact normally spaced from the shoulder of the drive torque to form an adjustable mounting and drive connection for taking up wear between the drive shaft and agitator center post and providing for adjustment of the torque socket until the lower edge of the lugs abuts said shoulder, and means for adjustably connecting the socket and center post to the drive torque.

2. A drive torque construction for connecting and oscillating the agitator center post of a washing machine from the drive shaft, comprising a male torque head on the drive shaft and a female torque socket on the center post, an outwardly projecting shoulder and tapered driving lugs and channels on the torque head provided adjacent its lower end and complementary tapered ribs and channels on the torque socket adapted to intermesh with the lugs and channels, with the socket having a driving contact normally spaced from the shoulder on the torque head to form an adjustable driving connection for taking up wear, and a threaded member carried by the center post adapted to adjustably connect the drive head and sockets and compensate for wear by adjusting the torque socket vertically on the torque head, said adjustment being limited only by engagement with the projecting shoulder, but providing for ready removal of the driven member.

CHARLES K. WOODIN.

CERTIFICATE OF CORRECTION.

Patent No. 2,202,679. May 28, 1940.

CHARLES K. WOODIN.

It is hereby certified that error appears in the printed specification of the above numbered patent requiring correction as follows: Page 2, second column, line 15, claim 2, for the word "sockets" read --socket--; and that the said Letters Patent should be read with this correction therein that the same may conform to the record of the case in the Patent Office.

Signed and sealed this 30th day of July, A. D. 1940.

(Seal)

Henry Van Arsdale,
Acting Commissioner of Patents.